United States Patent [19]

Adiletta

[11] Patent Number: 4,865,903
[45] Date of Patent: Sep. 12, 1989

[54] CHEMICALLY RESISTANT COMPOSITE STRUCTURES AND GARMENTS PRODUCED THEREFROM

[75] Inventor: Joseph G. Adiletta, Thompson, Conn.

[73] Assignee: Pall Corporation, Glen Cove, N.Y.

[21] Appl. No.: 130,742

[22] Filed: Dec. 9, 1987

[51] Int. Cl.$^4$ .......................... B32B 7/02; B32B 27/08
[52] U.S. Cl. ..................................... 428/215; 428/245; 428/252; 428/284; 428/286; 428/287; 428/421; 428/422
[58] Field of Search ............... 428/252, 245, 422, 215, 428/284, 286, 287

[56] References Cited

U.S. PATENT DOCUMENTS

| | | | |
|---|---|---|---|
| 3,513,064 | 5/1970 | Westley | 428/252 |
| 3,547,765 | 12/1970 | Snyder et al. | 428/252 |
| 4,165,404 | 8/1979 | Quehl | 428/422 |
| 4,610,918 | 9/1986 | Effenberger et al. | 428/245 |

*Primary Examiner*—Thomas J. Herbert
*Attorney, Agent, or Firm*—Leydig, Voit & Mayer

[57] ABSTRACT

A flexible, impermeable, universally chemically resistant composite structure which may be fabricated into protective clothing useful, for example, in the handling and clean up of hazardous chemicals is provided for, which composite structure comprises a fabric substrate, and thermally-melt-bonded on both sides thereof, a coated film, which coated film comprises a PTFE film having a thermoplastic fluoropolymer coating on both sides thereof. Preferably, the fabric substrate of the composite structure has been treated with an antiwicking agent.

A method for forming such composite structures is provided for, which method comprises thermally-melt-bonding a PTFE film having a thermoplastic fluoropolymer coating on both sides thereof to each side of a fabric substrate.

Articles of protective clothing are also provided for which are fabricated from the subject composite structures.

23 Claims, 2 Drawing Sheets

CHEMICALLY RESISTANT COMPOSITE STRUCTURES AND GARMENTS PRODUCED THEREFROM

TECHNICAL FIELD

This invention is related to composite structures suitable for use in protective clothing. More particularly, it is directed to flexible, impermeable, universally chemically resistant composite structures which may be fabricated into protective clothing useful, for example, in the handling and cleanup of hazardous chemicals.

BACKGROUND OF THE INVENTION

Polytetrafluoroethylene (PTFE) is widely regarded as one of the most universally chemically resistant chemical compounds. PTFE films are manufactured by special techniques well known in the art, such as molding-skinning, and are commercially available. They are not well suited, however, for use in fabricating protective clothing. Such films tear easily, and accordingly, often are damaged as they are fabricated into clothing. In handling chemicals or cleaning up spills, a person typically encounters a variety of tools and other objects with sharp or protruding edges. In other words, protective clothing must be capable of withstanding considerable wear and tear and fairly rough use, and PTFE films simply are not durable enough. Increasing the thickness of the PTFE film, while increasing the tensile strength of the film, is an inadequate solution because the natural stiffness of PTFE makes the film less flexible and introduces problems, especially splitting, during fabrication and wear of protective clothing.

Accordingly, PTFE films frequently are applied to both sides of a fabric substrate, such as a woven polyaramide or polyimide fabric. The resulting composite structure is more rugged than PTFE films alone. The fabric substrate acts to reinforce the PTFE film. Thinner PTFE films generally may be used, and thus, problems associated with stiffness of the film, although not eliminated, are reduced. Moreover, if the exterior PTFE film is punctured, the fabric substrate may be capable of preventing the puncture of the inner PTFE film, preserving the structural integrity of the barrier as a whole.

Such composite structures, however, are far from perfect. PTFE films are not self-adhering to fabric substrates. They also adhere poorly to most conventional adhesives, and in fact, Teflon ® PTFE material sold by E. I. duPont de Nemours & Co., Inc., Wilmington, Del., is widely used as a coating to prevent sticking of adhesives to machine rolls and parts. The surface of the PTFE film, however, may be chemically etched to permit the use of some high performance adhesives, such as epoxy and acrylic adhesives. Unfortunately, being subject to a variety of mechanical forces, adhesives often permit separation of the PTFE film from the fabric substrate during fabrication and use of the protective clothing. This problem is exacerbated if the outer PTFE film has split or has been punctured, thereby permitting potentially deleterious chemicals to penetrate the composite structure and destroy the adhesive.

Alternately, the PTFE film may be formed on the fabric substrate by successive coatings of PTFE emulsions. An excessive amount of PTFE, however, is required to produce an effective, pin-hole free chemical barrier, and the resulting composite structures typically are heavy and stiff.

Moreover, if the outer PTFE film is split or punctured and chemicals penetrate into the fabric substrate, many chemicals tend to wick through the fabric substrate and contaminate areas removed from the point of penetration. If the garment is to be repaired, larger portions of the composite material must be replaced, thereby increasing the cost of the repair and compromising unnecessarily the structural integrity of the garment.

Conventional antiwicking agents typically are not universal in their action. For example, silicone based antiwicking agents resist wicking of aqueous solutions, but not of organic solvents. Other antiwicking agents suffer the additional defect of having to be applied in amounts that create unacceptable stiffness.

It also is important, of course, that the effectiveness of the barrier not be compromised at the seams of the garments. In many applications, sewn seams are preferred because of their strength, but in sewing, holes are made in the barrier which are not leak proof until sealed. A number of approaches to sealing seam holes are utilized by workers in the art. Rubber, self-sealing tape can be placed between the portions to be sewn together whereby the self-sealing tape provides the primary seal in the seam holes. Alternately, a rubber sealant can be applied over the stitching to fill the holes. Yet another approach is to cover one or both sides of the seam with a heat sealable the consisting of a PTFE film coated on one side with an adhesive, such as silicone, or a thermoplastic fluoropolymer, such as fluorinated ethylene/propylene copolymers (FEP). Self-sealing tape, rubber sealants, and silicone adhesives, however, are not sufficiently chemically resistant, and when sealants or heat sealable tape is used, additional processing steps must be used in fabricating protective clothing.

The subject invention, therefore, is directed to composite structures and garments produced therefrom in which a PTFE barrier is securely adhered to a fabric substrate in a manner such that the composite structure not only may be successfully fabricated into garments with a low incidence of tearing or damage, but also such that the composite structure maintains its integrity during the life of the garment. It also is directed to composite structures and garments produced therefrom which provide light, flexible, universally chemically resistant barriers. It is directed further to composite structures and garments produced therefrom, the seams of which may be more efficiently formed and sealed and in such a manner as to provide a durable seal. Finally, the subject invention is directed to composite structures wherein the wicking of chemicals accidentally coming into contact with the fabric substrate is minimized, and wherein the antiwicking agent is more universally effective and does not decrease significantly the flexibility of the composite structure.

DISCLOSURE OF THE INVENTION

This invention provides for flexible, impermeable, universally chemically resistant composite structures suitable for use as material for articles of protective clothing, which composite structures comprise a fabric substrate, and thermally-melt-bonded on both sides thereof, a coated, universally chemically resistant film, which coated film comprises a PTFE film having a thermoplastic fluoropolymer coating on both sides thereof.

The subject invention further provides for a method for forming the subject composite structures, which method comprises thermal-melt-bonding a PTFE film having a thermoplastic fluoropolymer coating on both sides thereof to both sides of a fabric substrate.

The subject invention also provides for flexible, impermeable, universally chemically resistant composite structures suitable for use as material for articles of protective clothing, which composite structures comprise a fabric substrate, and thermally-melt-bonded on both sides thereof, a coated, universally chemically resistant film, which coated film comprises a PTFE film having a thermoplastic fluoropolymer coating on the inner side thereof.

The subject invention further provides for a method for forming those composite structures, which method comprises thermal-melt-bonding a PTFE film having a thermoplastic fluoropolymer coating on the inner side thereof to both sides of a fabric substrate.

This invention also provides for flexible, impermeable, universally chemically resistant composite structures suitable for use as material for articles of protective clothing, which composite structures comprise a fabric substrate, and on both sides thereof, a thermoplastic fluoropolymer film and a PTFE film, wherein said thermoplastic fluoropolymer film thermally-melt-bonds said PTFE film to said substrate.

The subject invention further provides for a method for forming those composite structures, which method comprises thermally-melt-bonding a PTFE film to both sides of a substrate by thermally-melt-bonding a thermoplastic fluoropolymer film interposed between said substrate and each said PTFE films.

It also provides for articles of protective clothing fabricated from the subject composite structures.

BEST MODE FOR CARRYING OUT THE INVENTION

Figure 1:
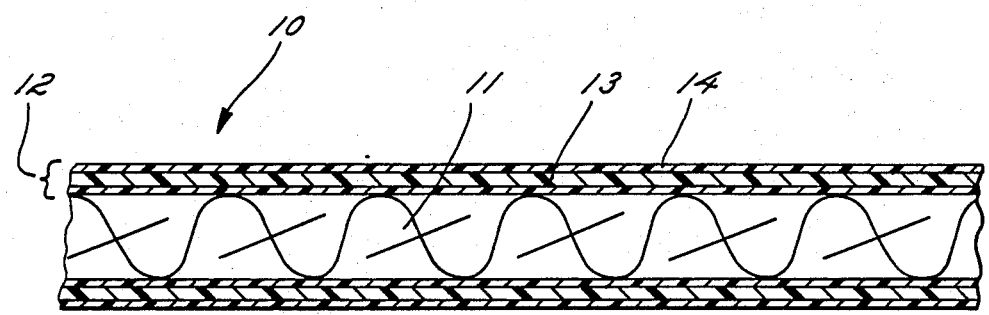
FIG. 1 is an unscaled, cross-section of a preferred embodiment of the composite structure of the subject invention.

As can be seen best in FIG. 1, a preferred embodiment of the composite structures 10 of the subject invention comprises a fabric substrate 11, and thermally bonded on both sides thereof, a coated, universally chemically resistant film 12, which coated film 12 comprises a PTFE film 13 having a thermoplastic fluoropolymer coating 14 on both sides thereof. Surprisingly, it was found from experimentation that with careful control of the thermal-melt-bonding process, it was possible to melt the thermoplastic fluoropolymer, thereby permitting it to bond the film to the fabric without melting the fabric.

Fabric Substrate

The fabric substrate of the subject invention may comprise any knit, woven, or non-woven fabric material which is generally suitable for use as clothing and which presents a reasonably flat contact area for bonding. Such fabric material also should be dimensionally stable and otherwise capable of withstanding the temperatures encountered in thermal-melt-bonding the coated film to the fabric substrate. Those temperatures will vary according to the thermoplastic fluoropolymers selected for the coated film, but in general will be higher than about 550° F. Accordingly, such fabric materials are composed of a variety of natural and synthetic fibers, including metal, polyimide, aromatic aramid, carbon, glass, graphite, ceramic, potassium titanate, and blends thereof. In general, the fabric substrate will have a thickness of from about 0.010 to about 0.200", preferably from about 0.050 to about 0.060", and a weight of from about 2.0 to about 10.0 ounce/yard$^2$ (oz/sy), preferably from about 3.0 to about 4.0 oz/sy. While suitable fabric substrate material may be manufactured by methods well known in the art, they also are available commercially from a variety of manufacturers.

Woven fabric is preferred because of its relative strength and flexibility as compared to non-woven fabric material. For this reason, polyaramide and polyimide fabrics, and blends thereof, are especially preferred. Those fabrics are tough and durable, and are extremely resistant to tear and puncturing, especially on an equivalent weight and weave basis. Accordingly, even when the outer coated film layer is penetrated, a polyaramide or polyimide fabric substrate is much more capable of preventing puncturing or tearing of the inside coated film and, thus, of preserving a leak proof, impermeable chemical barrier. Polyaramide and polyimide fabrics also impart a degree of thermal insulation against the heat of fires which may be encountered in chemical accidents, are flame resistant, and themselves are somewhat chemically inert.

Woven fabrics, however, are relatively expensive. It has been found that a less expensive, spun-laced Nomex-®/Kevlar ® polyaramide blend fabric provides adequate strength and flexibility while providing a better bonding surface, and accordingly, such fabrics are especially preferred. Those fabrics are preferred also because they have a high voids volume which acts as thermal insulation.

Suitable polyaramide fabrics, and blends thereof, may be manufactured by methods well known in the art and are commercially available in a variety of weights and weaves from a number of sources, including Burlington Industrial Fabrics Co., Greensboro, N.C.; Hexcel Corporation, Dublin, Calif.; Uniroyal Goodrich Tire Co., Winnsboro, S.C.; and E. I. du Pont de Nemours & Co., Inc., which markets Kevlar and Nomex polyaramide fibers and the spun-laced Nomex/Kevlar E-89 polyaramid blend fabric referred to above.

Antiwicking Agent

The fabric substrate preferably is treated with an antiwicking agent. Conventional antiwicking agents, such as silicone, and with somewhat lesser success, high temperature wax emulsions, may be used, so long as they are applied easily, can withstand the thermal bonding temperatures, do not significantly affect the stiffness of the fabric substrate or composite structure, and otherwise generally are compatible with the fabric substrate and composite structure.

It is preferred, however, that the fabric substrate be treated with the antiwicking compositions described in U.S. patent application Ser. No. 130,743, of J. G. Adiletta, filed herewith on Dec. 9, 1987 and entitled Antiwicking Compositions and Fabrics Treated Therewith, the disclosure of which is incorporated in its entirety by this reference thereto. As is more fully described therein, those antiwicking compositions comprise a fluorinated ethylene/propylene copolymer, a polymeric fluoroaliphatic ester, a carrier liquid, and a dispersant. Preferably, the antiwicking agent also comprises a wetting/saturating agent to facilitate its application to the fabric substrate.

Those antiwicking agents are especially preferred because they provide more universal antiwicking properties, that is, they repel water, oil, organic solvents, and chemicals, not merely aqueous chemicals. They also do not significantly decrease the flexibility of the fabric substrate or composite structure and, because they are based on fluorocarbon polymers, are especially compatible with the thermoplastic fluoropolymer coated PTFE film utilized in the subject invention.

Universally Chemically Resistant Film

The composite structures of the subject invention preferably comprise a coated, universally chemically resistant film, which coated film comprises a PTFE film preferably having a thermoplastic fluoropolymer coating on both sides thereof. As noted above, the subject invention also is directed to composites comprising a PTFE film coated only on its inner side with a thermoplastic fluoropolymer, and composites comprising separate, pre-formed PTFE and thermoplastic polymer films. An understanding of those latter preferred embodiments, however, will come from the description which follows wherein a PTFE film is coated on both sides with the thermoplastic fluoropolymer.

The PTFE films useful in the subject invention are composed primarily of PTFE. While they may contain certain additives, such as wetting agents, or copolymers, preferably the presence of such components in the PTFE films at least is minimized, if not avoided altogether. Necessarily, any such component is not as universally chemically resistant as PTFE, and if present, the chemical resistance of the film is decreased. Thus, PTFE films substantially free of additional components are especially preferred. Hard polymers, such as epoxy, phenolics, and the like especially are to be avoided in that they not only decrease the chemical resistance of the PTFE film, but also because they tend to increase the stiffness of the PTFE film.

The PTFE film preferably is coated on both sides with a thermoplastic fluoropolymer. Thermoplastic fluoropolymers, unlike PTFE which sinters, flow when heated and are fusible. Accordingly, any of a number of well known thermoplastic polymers may be used herein, such as FEP, tetrafluoroethylene/ethylene copolymers, tetrafluoroethylene/perfluorovinyl ether copolymers, polychlorotrifluoroethylene, poly(vinyl fluoride), poly(vinylidene fluoride), and mixtures thereof.

Because it is more universally chemically resistant, it will be appreciated that the primary barrier is provided by the PTFE film. Being fluorocarbon polymers, however, thermoplastic fluoropolymers are similarly resistant to a wide variety of chemicals, and the thermoplastic fluorocarbon coatings do contribute to the formation of an effective chemical barrier.

More importantly, because of their thermoplastic properties, the thermoplastic fluoropolymer coatings also bind the coated film to the fabric substrate and assist in maintaining the integrity of the barrier in the seam area. The inner coating of thermoplastic fluoropolymer may be thermally-melt-bonded directly to the fabric substrate, and thereby bind the PTFE film securely to the fabric substrate without the use of adhesives. Unlike conventional adhesives, the bond between the inner thermoplastic fluoropolymer coating and the fabric substrate is not easily destroyed by chemicals penetrating the laminate. Moreover, the inner thermoplastic fluoropolymer coating bonds the PTFE film to the fabric substrate without appreciably increasing the stiffness of the composite structure and, when heated, can assist in sealing the seam area by flowing into and around the seam holes.

An outer thermoplastic fluoropolymer coating, in those embodiments wherein it is present, contributes additional, important benefits. It enables more efficient filling of the seam holes in sewn seams. The outer coatings of adjacent portions of composite material also may be thermally-melt-bonded in the seam area. Depending on the stress which the seam is expected to encounter, such thermal-melt-bonding alone may provide a seam of sufficient strength without stitching. Even where the seam is sewn, however, the strength of the seam and the effectiveness of the seal may be increased by thermally-melt-bonding the seam area. Similarly, if the use of such tape is desired in fabricating protective clothing, an outer coating enables a more effective bonding with PTFE/FEP tape.

The thickness and weight of the coated film will vary depending on the wear and chemical exposure which the material is expected to withstand, and also depending on the relative thickness and weight of the PTFE layer and the thermoplastic fluoropolymer coatings. As the coated film is made thicker and heavier, it will become unacceptably inflexible and fatiguing to those wearing clothing made therefrom. The physical barrier will be thicker, and all other factors equal, will be more effective of course, but this theoretical enhancement of the barrier is more than offset by discomfort resulting from increasing weight. In general, the thinnest possible coated film, consistent with the formation of an effective barrier, should be used insofar as this contributes to a lighter, more flexible garment, and one in which thermal bonding of the coated film and heat sealing of the seams can be accomplished more effectively. That is, the thickness and weight of each coated film layer of the composite structure preferably is such that each coated film layer alone can provide an effective chemical barrier in itself. Thinner, lighter coated films may be used, but if the outer coated film layer is punctured, the inner coated film layer preferably will be sufficient to provide an effective chemical barrier alone. In any event, the coated film should not be so thin and light that it is difficult to handle during fabrication.

Accordingly, the overall thickness of each coated film in the subject invention is from about 0.0015 to about 0.005", preferably from about 0.002 to about 0.003". The weight generally is from about 3.0 to about 10.0 oz/sy, preferably from about 4.0 to about 6.0 oz/sy.

The PTFE film of the coated film layer should be thick and heavy enough to form an effective chemical barrier in itself and to enable it to be handled during coating with the thermoplastic fluoropolymer. That is, as for the coated film layer, the PTFE film also should provide an effective chemical barrier apart from the combined effectiveness of the two coated film layers or the thermoplastic fluorocarbon coatings. Apart from other considerations, there always is the risk of the thermal-melt-bonding process compromising the integrity of the thermoplastic fluorocarbon coating, and thus, each PTFE film should present an effective chemical barrier regardless of whether the structural integrity of the thermoplastic fluoropolymer coating or the other coated film layer is compromised. The PTFE film also should not be so thin and light, however, that it is easily punctured or torn during processing. In general, therefore, each PTFE film will be from about 0.0013 to about 0.003", preferably from about 0.0016 to about 0.0018" thick. The weight of the PTFE film generally is from about 2.6 to about 6.0 oz/sy, preferably from about 3.2 to about 3.6 oz/sy.

The thermoplastic fluoropolymer coating preferably is of the minimum thickness needed to effectively bind the coated film layer to the fabric substrate, although the outer coating, since it does not have to bond to fabric, may be somewhat thinner than the inner coating. Excessive thermoplastic fluoropolymer will increase the stiffness of the coated film and the composite structure and will not increase appreciably the effectiveness of the chemical barrier during use. Accordingly, each thermoplastic fluoropolymer coating generally is from about 0.0001 to about 0.0019", preferably from about 0.0004 to about 0.0006" thick. The weight of the thermoplastic fluoropolymer coating generally is from about 0.20 to about 2.0 oz/sy, preferably from about 0.40 to about 1.2 oz/sy.

Construction of the Composite Structure

The composite structure of the subject invention preferably is formed by thermally-melt-bonding pre-formed coated films to each side of the fabric substrate. The fabric substrate preferably is pre-treated with an antiwicking agent. Methods of applying the antiwicking agent are well known in the art and also are disclosed in U.S. Pat. No. 130,743 referenced above.

The coated film itself preferably is formed by coating a PTFE film with a thermoplastic fluoropolymer. Suitable PTFE films may be manufactured by well known procedures, e.g., molding-skinning a PTFE dispersion. Suitable PTFE dispersions, as well as PTFE films are available commercially from a number of sources, including, DuPont (Teflon®), and Allied Chemical, Morristown, N.J. (Halon ™).

The PTFE film also may be coated by methods well known in the art, e.g., casting a thermoplastic fluoropolymer dispersion over the film or by dipping the film into a thermoplastic fluoropolymer dispersion. Suitable thermoplastic fluoropolymer dispersions are available commercially, e.g., Teflon® FEP dispersions sold by DuPont. Thermoplastic fluoropolymer coated PTFE films also are available commercially, e.g., Emflon ™ FEP coated PTFE films sold by Pallflex, Inc., Putnam, Conn.

The coated film then is thermally-melt-bonded to the fabric substrate. Thermal-melt-bonding techniques are well known in the art and in general may be utilized. In the context of the subject invention, however, it will be appreciated that the thermal rating of the fabric substrate typically is lower than that of the thermoplastic fluoropolymer. Thus, care should be taken to ensure that the substrate is not melted or scorched during the thermal-melt-bonding process. The thermal-melt-bonding process, therefore, typically is conducted at somewhat higher temperatures, higher pressures, and shorter dwell times than would be utilized where the thermal ratings of the substrate and film were more nearly equal. Thereby, the thermoplastic fluoropolymer coating preferably is not melted per se, but rather is heated to a gel-like condition. Accordingly, the thermal-melt-bonding typically will involve temperatures of from about 500 to about 700° F., pressures of from about 1.0 to about 25.0 psi, and dwell times from about 1.0 to about 20.0 sec. The specific bonding parameters will depend primarily on the composition, thickness, and weight of the coated film and the substrate, but are readily optimized by those skilled in the art.

The novel composite structures also can be made by thermally-melt-bonding pre-formed PTFE and thermoplastic fluoropolymer films to the substrate. Suitable thermoplastic fluoropolymer films may be made by methods well known in the art, and also are commercially available. The pre-formed thermoplastic fluoropolymer film, in theory, may be as thick as the thermoplastic fluoropolymer coating, i.e., from about 0.0001 to about 0.00019, preferably from about 0.002 to about 0.0006 inches thick. It will be appreciated, however, that at the lower limits of those ranges, the thin thermoplastic fluoropolymer films are somewhat difficult to handle, and may tend to tear during processing. Accordingly, if a pre-formed thermoplastic fluoropolymer film is used, it generally will be from about 0.0007 to about 0.0019" thick, or of such other minimum thickness which enables it to sufficiently bond the PTFE film and to be handled by the processing equipment used.

In theory, it should be possible to pre-coat the fabric substrate with the thermoplastic fluoropolymer and then melt-bond a PTFE film thereto. In practise, however, that process generally will result in an excessively thick and heavy thermoplastic fluoropolymer layer and should be avoided. If possible at all, it is very difficult to obtain the full benefits of the subject invention by that technique.

Construction of Protective Clothing

The composite structures of the subject invention may be used to fabricate articles of protective clothing, such as hats, gloves, jump suits, coveralls, and the like, in general, by conventional processes. Because the composite structures of the subject invention have increased strength and flexibility, they may be joined by a variety of seams, especially when the coated film comprises an outer coating. Some seams, such as those in the crotch or arm pit areas of clothing, must be very sturdy, whereas others, such as those in head gear, may be subject to very little stress. Where increased strength is important, sewn seams are preferred. There are a variety of sewn seams which are well known in the art and which may be used, such as lap seams, but because they are both strong and may be efficiently sealed, folded parallel seams are especially preferred.

Figure 2:
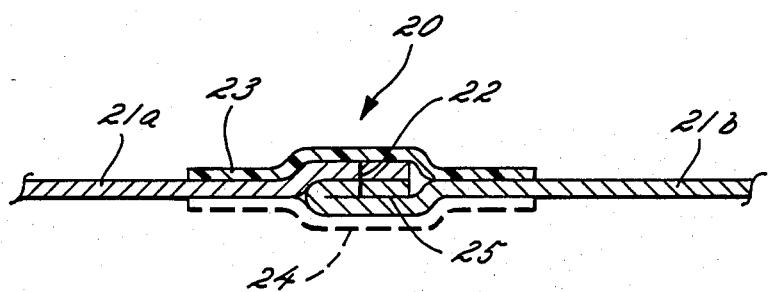
FIG. 2 is an unscaled, cross-sectional view of a parallel seam preferred in fabricating garments of the subject invention, wherein the various layers of the composite structure are not shown.

In folded parallel seams, as shown in FIG. 2, one of the two pieces of composite material 21a and 21b is folded over the stitched area 22 of the seam 20 in such a manner that a portion of the composite structure 21b is folded over and abuts those portions of the composite structures 21a and 21b, the barrier of which has been structurally compromised by the stitching. The risk of chemical penetration through the seam area, and in particular, through the stitching is reduced, and accordingly, protective clothing of the subject invention preferably will utilize parallel seams. The outer thermoplastic fluoropolymer coatings abutting each other at the stitching area 22 and/or the fold-over area 25 may be thermally-melt-bonded together for added strength. Even where such added strength is not needed, the seam area preferably is heated to a degree sufficient to permit portions of the thermoplastic fluoropolymer coating to flow into and seal the stitching holes. Additionally, a layer of heat sealed PTFE/FEP tape 23 preferably is applied on one side of the seam area to cover otherwise exposed stitching. A second layer of PTFE/FEP tape 24 (shown in broken lines) may be applied to the other side for added strength and sealing, but for many purposes neither tape layer is strictly necessary, especially if the seam has been heat sealed as described above.

If the coated film is provided with an outer thermoplastic fluoropolymer coating, it may not be necessary to stitch a seam. Thermal-melt-bonding of the outer coating of joined pieces may provide a seam of sufficient strength for the particular application, and this has the benefit of not forming holes which later must be sealed.

The invention will be further described by reference to the following examples. They are not intended to limit the scope of the invention; rather, they are presented merely to facilitate the practice of the invention by those of ordinary skill in the art and to further disclose the inventor's best mode of doing so.

EXAMPLE 1

Two coated films are tested for liquid permeation of 50 wt % NaOH and 96 wt % $H_2SO_4$ at room temperature. The coated films comprise a PTFE film coated on both sides with FEP. The liquid permeation test follows the procedure set forth in publication F739-85 of the American Society for Testing and Materials (ASTM), 1916 Race Street, Philadelphia, Pa. 19103, which is incorporated by this reference thereto, wherein the duration of the measurement period is 90 minutes and impermeability is defined as less than one part per million permeation.

Figure 3:
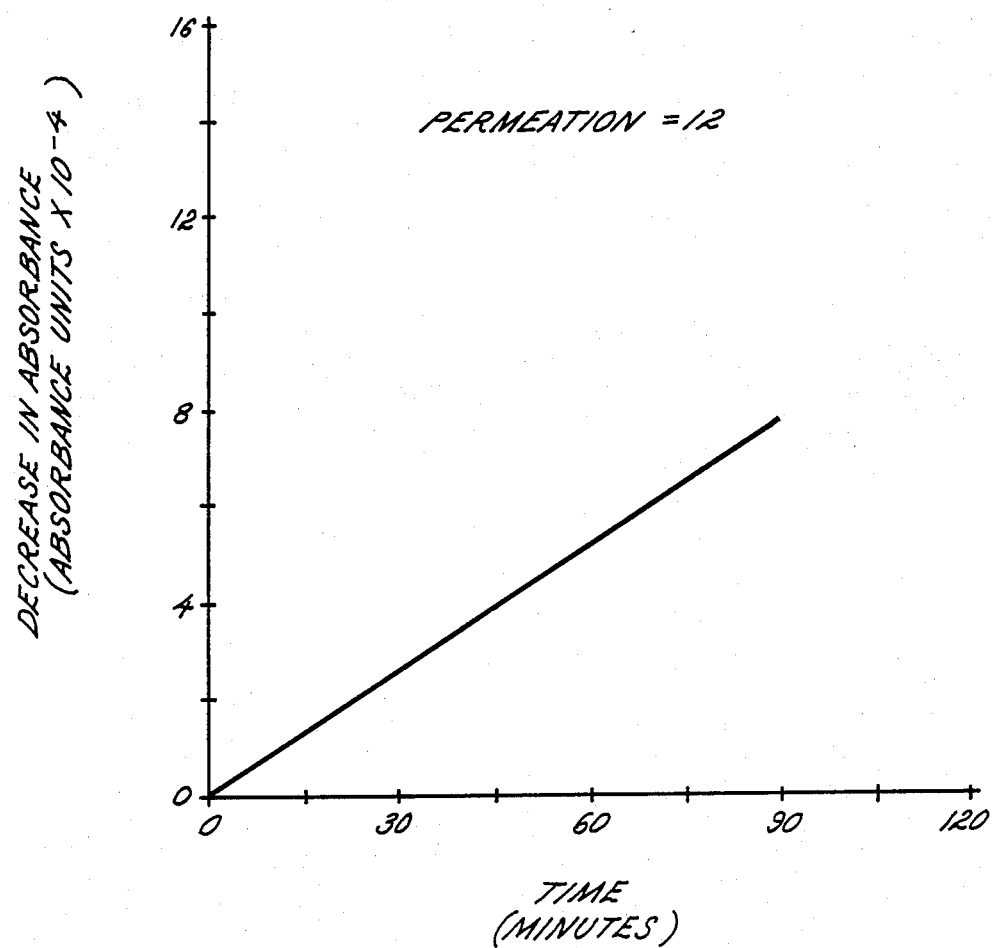
FIG. 3 is a graph showing impermeability of the novel composite structures, as discussed in greater detail in Example 2.

The results of this experiment will be as set forth below in Table I.

impermeability of the film to dimethylformamide in hexane is confirmed by monitoring the uv absorbance ($\lambda = 238$ nm) in the test cell. The results will be as shown in FIG. 3, wherein a decrease in absorbance of approximately 0.0012 absorbance units indicates permeation as defined herein, i.e., 1 part per million.

In sum, the composite structures will be light, flexible, and exhibit resistance to liquid permeation, as defined herein, of the challenge fluids for a period of 90 minutes.

As noted above, this invention has been disclosed and discussed primarily in terms of specific embodiments thereof, but is not intended to be limited thereto. Other modifications and embodiments will be apparent to the worker in the art. For example, the composite structures of the subject invention have been described primarily in the context of protective clothing. While that is a particularly preferred application, the composite structures of the subject invention may be used for other purposes, such as wall coverings. In such applications, increase flexibility may not be of as great a concern, and thicker, stiffer composite structures may be utilized.

I claim:

1. A composite structure suitable for use as material for articles of protective clothing, which composite structure comprises a fabric substrate, and thermally-melt-bonded on both sides thereof, a coated film, which coated film consists essentially of a PTFE film having a thermoplastic fluoropolymer coating on both sides thereof.

2. The composite structure of claim 1, wherein said fabric substrate has a thickness of from about 0.010 to about 0.200", and a weight of from about 2.0 to about 10.0 oz/sy, said PTFE film has a thickness of from about 0.0013 to about 0.003", and a weight from about 2.6 to about 6.0 oz/sy, and said thermoplastic fluoropolymer coating has a thickness of from about 0.0001 to about 0.0019", and a weight of from about 0.20 to about 2.0 oz/sy.

3. The composite structure of claim 1, wherein said

| Specimen | Contact Area (cm²) | Film Thickness (inches) | Weight Per Unit Area (oz/sy) | Challenge Fluid | Impermeable? |
|---|---|---|---|---|---|
| 1 | 20.4 | 0.0023 | 6.93 | 50 wt % NaOH | yes |
| 2 | 20.4 | 0.0021 | 6.84 | 96 wt % $H_2SO_4$ | yes |

In summary, the coated PTFE films will exhibit complete resistance to liquid permeation, as defined herein, of 50 wt % NaOH and of 96 wt % $H_2SO_4$ for a period of 90 minutes.

EXAMPLE 2

PTFE film coated on both sides with FEP is thermally-melt-bonded to both sides of a spun-laced Nomex/Kevlar polyaramid blend fabric. The fabric is obtained from DuPont, Product No. E-89, and has a thickness of 0.022" and a weight of 2.8 oz/sy. The film is generally as described in Example 1 and has a thickness of about 0.003" and a weight of about 6.0 oz/sy. The composite structure is evaluated for permeation by following generally the procedure set forth in Example 1, wherein the challenge fluids are dimethylformamide in hexane, toluene, vinyl acetate, 50 wt % NaOH, 97 wt % $H_2SO_4$, and glacial acetic acid.

Permeation may be detected and measured by techniques appropriate to the challenge fluid. For example, thermoplastic polymer coating comprises a thermoplastic fluoropolymer selected from the group consisting of fluorinated ethylene/propylene copolymers, tetrafluoroethylene/ethylene copolymers, tetrafluoroethylene/perfluorovinyl ether copolymers, polychlorotrifluoroethylene, poly(vinyl fluoride), poly(vinylidene fluoride), and mixtures thereof.

4. An article of clothing comprising the composite structure of claim 1.

5. The composite structure of claim 1, wherein said fabric substrate is selected from the group consisting of polyaramide and polyimide fabrics, and blends thereof.

6. The composite structure of claim 5, wherein said thermoplastic polymer coating comprises a thermoplastic fluoropolymer selected from the group consisting of fluorinated ethylene/propylene copolymers, tetrafluoroethylene/ethylene copolymers, tetrafluoroethylene/perfluorovinyl ether copolymers, polychlorotrifluoroethylene, poly(vinyl fluoride), poly(vinylidene fluoride), and mixtures thereof.

7. The composite structure of claim 5, wherein said fabric substrate has a thickness of from about 0.010 to about 0.200", and a weight of from about 2.0 to about 10.0 oz/sy, said PTFE film has a thickness of from about 0.0013 to about 0.003", and a weight from about 2.6 to about 6.0 oz/sy, and said thermoplastic fluoropolymer coating has a thickness of from about 0.0001 to about 0.0019", and a weight of from about 0.20 to about 2.0 oz/sy.

8. The composite structure of claim 1, wherein said fabric substrate has been treated with an antiwicking agent.

9. The composite structure of claim 8, wherein said fabric substrate is selected from the group consisting of polyaramide and polyimide fabrics, and blends thereof.

10. The composite structure of claim 8, wherein said thermoplastic polymer coating comprises a thermoplastic fluoropolymer selected from the group consisting of fluorinated ethylene/propylene copolymers, tetrafluoroethylene/ethylene copolymers, tetrafluoroethylene/perfluorovinyl ether copolymers, polychlorotrifluoroethylene, poly(vinyl fluoride), poly(vinylidene fluoride), and mixtures thereof.

11. The composite structure of claim 8, wherein said fabric substrate has a thickness of from about 0.010 to about 0.200", and a weight of from about 2.0 to about 10.0 oz/sy, said PTFE film has a thickness of from about 0.0013 to about 0.003", and a weight from about 2.6 to about 6.0 oz/sy, and said thermoplastic fluoropolymer coating has a thickness of from about 0.0001 to about 0.0019", and a weight of from about 0.20 to about 2.0 oz/sy.

12. The composite structure of claim 8, wherein said antiwicking agent is a composition comprising a fluorinated ethylene/propylene, copolymer, a polymeric fluoroaliphatic ester, a dispersant, a wetting/saturating agent, and a carrier.

13. The composite structure of claim 12, wherein said fabric substrate is selected from the group consisting of polyaramide and polyimide fabrics, and blends thereof.

14. The composite structure of claim 8, wherein said antiwicking agent is a composition comprising a fluorinated ethylene/propylene copolymer, a polymeric fluoroaliphatic ester, a carrier liquid, and a dispersant.

15. The composite structure of claim 14, wherein said thermoplastic polymer coating comprises a thermoplastic fluoropolymer selected from the group consisting of fluorinated ethylene/propylene copolymers, tetrafluoroethylene/ethylene copolymers, tetrafluoroethylene/perfluorovinyl ether copolymers, polychlorotrifluoroethylene, poly(vinyl fluoride), poly(vinylidene fluoride), and mixtures thereof.

16. The composite structure of claim 14, wherein said fabric substrate has a thickness of from about 0.010 to about 0.200", and a weight of from about 2.0 to about 10.0 oz/sy, said PTFE film has a thickness of from about 0.0013 to about 0.003", and a weight from about 2.6 to about 6.0 oz/sy, and said thermoplastic fluoropolymer coating has a thickness of from about 0.0001 to about 0.0019", and a weight of from about 0.20 to about 2.0 oz/sy.

17. The composite structure of claim 14, wherein said fabric substrate is selected from the group consisting of polyaramide and polyimide fabrics, and blends thereof.

18. The composite structure of claim 17, wherein said thermoplastic polymer coating comprises a thermoplastic fluoropolymer selected from the group consisting of fluorinated ethylene/propylene copolymers, tetrafluoroethylene/ethylene copolymers, tetrafluoroethylene/perfluorovinyl ether copolymers, polychlorotrifluoroethylene, poly(vinyl fluoride), poly(vinylidene fluoride), and mixtures thereof.

19. The composite structure of claim 17, wherein said fabric substrate has a thickness of from about 0.010 to about 0.200", and a weight of from about 2.0 to about 10.0 oz/sy, said PTFE film has a thickness of from about 0.0013 to about 0.003", and a weight from about 2.6 to about 6.0 oz/sy, and said thermoplastic fluoropolymer coating has a thickness of from about 0.0001 to about 0.001", and a weight of from about 0.20 to about 2.0 oz/sy.

20. A composite structure suitable for use as material for articles of protective clothing, which composite structure comprises a fabric substrate, and thermally-melt-bonded on both sides thereof, a coated film, which coated film consists essentially of a PTFE film having a thermoplastic fluoropolymer coating on the inner side thereof.

21. An article of clothing comprising the composite structure of claim 20.

22. A composite structure suitable for use as material for articles of protective clothing, which composite structure comprises a fabric substrate, and on both sides thereof, a thermoplastic fluoropolymer film and a PTFE film, wherein said thermoplastic fluoropolymer thermally-melt-bonds said PTFE film to said substrate.

23. An article of clothing comprising the composite structure of claim 22.

* * * * *